(12) United States Patent
Olson et al.

(10) Patent No.: US 8,995,076 B1
(45) Date of Patent: Mar. 31, 2015

(54) HEAD-MEDIUM CONTACT DETECTION USING ELECTROMAGNETIC ATTRACTION

(71) Applicant: Seagate Technology LLC, Cupertino, CA (US)

(72) Inventors: Daniel W. Olson, Minneapolis, MN (US); David J. Ellison, Minneapolis, MN (US); Michael Thomas Johnson, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/257,266

(22) Filed: Apr. 21, 2014

(51) Int. Cl.
*G11B 5/02* (2006.01)
*G11B 5/596* (2006.01)

(52) U.S. Cl.
CPC .................................... *G11B 5/596* (2013.01)
USPC .................... 360/55; 360/59; 360/39; 360/69

(58) Field of Classification Search
None
See application file for complete search history.

(56) References Cited

U.S. PATENT DOCUMENTS

| | | | |
|---|---|---|---|
| 7,016,139 B2 | 3/2006 | Baumgart et al. | |
| 7,046,473 B2 | 5/2006 | Fu et al. | |
| 7,321,476 B2 | 1/2008 | Baumgart et al. | |
| 7,679,857 B2 | 3/2010 | Zhu et al. | |
| 7,719,786 B1 | 5/2010 | Baumgart et al. | |
| 7,830,634 B2 | 11/2010 | Chen et al. | |
| 8,049,984 B2 | 11/2011 | Contreras et al. | |
| 8,085,490 B2 | 12/2011 | Franca-Neto et al. | |
| 8,523,312 B2 * | 9/2013 | Zheng et al. | 360/75 |
| 8,630,057 B2 | 1/2014 | Murthy et al. | |
| 8,638,349 B1 | 1/2014 | Liu et al. | |
| 2006/0139789 A1 * | 6/2006 | Yang | 360/75 |
| 2011/0157736 A1 | 6/2011 | Contreras et al. | |

* cited by examiner

*Primary Examiner* — Muhammad N Edun
(74) *Attorney, Agent, or Firm* — Hollingsworth Davis, LLC

(57) ABSTRACT

An apparatus of the present disclosure generally includes a recording head, circuitry, a thermal sensor, and a detector. The recording head has an electromagnetic attraction to a recording medium. The circuitry is configured to oscillate the electromagnetic attraction between the recording head and the recording medium. The oscillating electromagnetic attraction produces a corresponding oscillating clearance between the recording head and the recording medium. The thermal sensor, located in or near the recording head, senses an oscillating temperature that is induced by the oscillating clearance and produces a sensor signal that is representative of the sensed temperature. The detector is coupled to the thermal sensor and is configured to detect at least one of head-medium contact and clearance using the sensor signal and the electromagnetic attraction.

20 Claims, 5 Drawing Sheets

HEAD-MEDIUM CONTACT DETECTION USING ELECTROMAGNETIC ATTRACTION

SUMMARY

An apparatus of the present disclosure generally includes a recording head, circuitry, a thermal sensor, and a detector. The recording head has an electromagnetic attraction to a recording medium. The circuitry is configured to oscillate the electromagnetic attraction between the recording head and the recording medium. The oscillating electromagnetic attraction produces a corresponding oscillating clearance between the recording head and the recording medium. The thermal sensor, located in or near the recording head, senses an oscillating temperature that is induced by the oscillating clearance and produces a sensor signal that is representative of the sensed temperature. The detector is coupled to the thermal sensor and is configured to detect at least one of head-medium contact and clearance using the sensor signal and the electromagnetic attraction.

Another apparatus of the present disclosure generally includes circuitry and a controller. The circuitry is configured to oscillate an electromagnetic attraction between a recording head and a recording medium. The oscillating electromagnetic attractions produce a corresponding oscillating clearance between the recording head and the recording medium. The controller is coupled to the circuitry and is configured to sense an oscillating temperature induced by the oscillating clearance; and to detect head-medium contact using the sensed temperature and the electromagnetic attraction.

A method of the present disclosure includes causing an oscillation in electromagnetic attraction between a recording head and a recording medium. It further includes causing, by the oscillating electromagnetic attraction, an oscillation in a signal produced by a thermal sensor in or near the recording head, and detecting head-medium contact using both the signal from the thermal sensor and the electromagnetic attraction.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
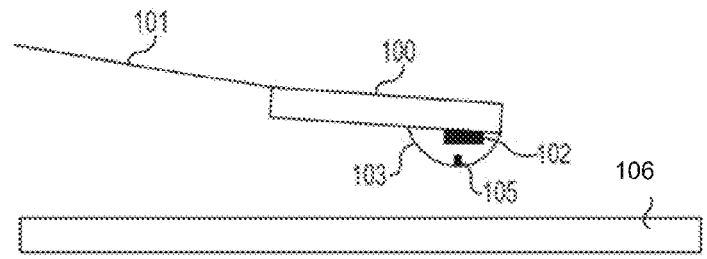
FIG. 1 is a simplified side view of a heater-actuated head transducer arrangement which incorporates a temperature coefficient of resistance (TCR) sensor in accordance with various embodiments.
Figure 2:
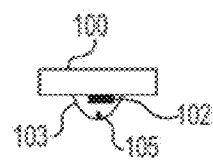
FIG. 2 is a front view of the heater-actuated head transducer arrangement shown in FIG. 1.
Figure 3:
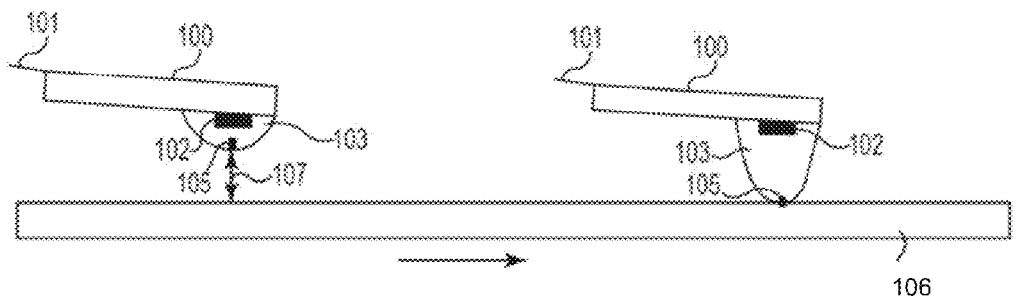
FIG. 3 shows the heater-actuated head transducer arrangement of FIGS. 1 and 2 in a pre-actuated configuration and an actuated configuration.

In accordance with various embodiments, and with reference to FIGS. 1-3, a slider 100 is shown supported by a suspension 101 in close proximity to a rotating magnetic storage medium 106. The slider 100 supports a recording head transducer 103 and a heater 102 thermally coupled to the head transducer 103. A temperature coefficient of resistance (TCR) sensor 105 is shown situated on the head transducer 103 at the close point to the magnetic recording medium 106. The close point is generally understood to be the closest point of contact between the head transducer 103 and the magnetic recording medium 106. The TCR sensor 105 may comprise a dual-ended temperature coefficient of resistance (DETCR) sensor. A TCR-type sensor measures temperature change by measuring the change in resistance, or rate of change of resistance, across the sensor and, as such, can sense variations in head-media spacing and, in some embodiments, asperities of the medium 106.

As is depicted in FIG. 3, before head-media contact, there is an air gap 107 defined between the hot head surface and the relatively cool disk 106. The heater 102 and TCR sensor 105 can be used to control this air gap 107, or spacing, between the slider 100 and the magnetic medium 106. For example, energizing the heater 102 causes a local protrusion at the head transducer 103 and this protrusion can be controlled by changing a current applied to the heater 102. TCR sensor 105 can detect spacing between and contact with the magnetic medium 106 by measuring a known thermal signature as the slider 100 approaches and/or contacts the medium 106.

Figure 4:
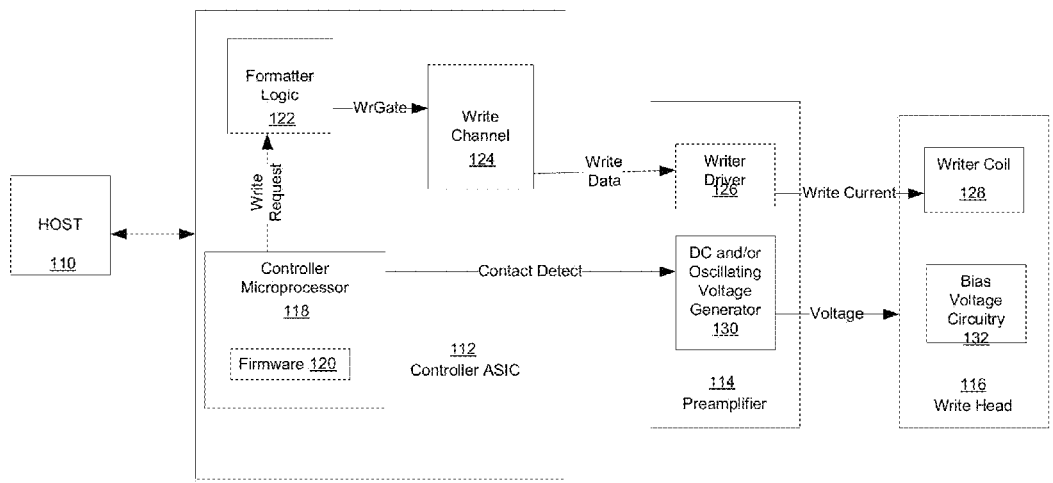
FIG. 4 is a block diagram illustrating an example of components used in a write operation to implement head-medium contact detection using electromagnetic force in accordance with various embodiments.

Referring now to FIG. 4, a block diagram provides an example of the some of the components used by a hard disk drive during a write operation. The components include a host 110, a controller application-specific integrated circuit (ASIC) 112, a preamplifier 114 and a write head 116. The host 110 may comprise a computer or other similar device capable of performing a sequence of logical operations, and may be coupled to the ASIC 112 via host protocols such as SATA, SaS, SCSI, PCI, etc. The controller ASIC 112 generally includes a controller microprocessor 118 operating under control of firmware 120, a formatter 122 utilizing formatter logic and a write channel 124. The preamplifier 114 includes a writer driver 126 while the write head 116 includes writer coil 128.

In operation, the host 110 initiates a write operation that is communicated to the controller ASIC 112 and specifically to the controller microprocessor 118. The controller microprocessor 118 has been programmed, via the firmware 120, to operate on the host instruction and generate a write request to the formatter 122 as well as seek a desired track/position on the magnetic recording medium 106 (see FIGS. 1 and 3). The formatter 122 asserts the WrGate signal to the write channel 124 which enables the writer driver 126 of the preamplifier 114. In this example, the write channel 124 provides write data to the write driver 126. The current from the writer driver 126 activates the writer coil 128, allowing the write head 116 to complete the write operation.

For an accurate write operation to occur, it is desirable to have a relatively small distance or spacing between a recording head and its associated media. This distance or spacing is known as "fly-height" or "head-media spacing." By reducing the fly height, a recording head is typically better able to both write and read data to and from a medium. Reducing the fly height also allows for surveying of recording medium topography, such as for detecting asperities and other features of the recording medium surface. Head-media contact detection and/or head-media spacing sensing technologies contribute to the performance and reliability of magnetic storage systems. Higher contact detection repeatability enables lower active clearance, and thus higher recording density. Higher contact detection sensitivity reduces wear and improves reliability.

Contact detection may be performed before the head-disk system begins any type of recording. Contact detect may be performed on a head-by-head basis and requires significant interaction time between head and disk. Today, many systems implement a contact detection scheme which involves determining the heater power necessary to cause thermal expansion of the slider (head) from a passive fly condition to intermittent head-disk contact. This intermittent contact may cause significant modulation of the slider fly height. The modulation of slider fly height then results in modulation of heat transfer between the head and disk. A thermal proximity sensor, for example a dual ended temperature coefficient of resistance (DETCR) sensor, can easily pick up these relatively large fluctuations in head-disk heat transfer. The readings from the thermal proximity sensor in combination with the heater power can be used to establish contact detection.

However, newly developed low clearance technology (LCT) head-disk systems have reduced or eliminated fly height modulation due to intermittent head-disk contact. The reduction/elimination of fly height modulation has beneficially resulted in the reduced wear of the head during contact detect and unintended head-disk interaction. However, it has also unfortunately resulted in the reduction of contact detect strength by the sensors, and/or techniques, that rely on the fly height modulation. As such, in response to the contact detect challenges presented by LCT head-disk systems, a low-frequency AC heater (LFACH) contact detect scheme was developed. In LFACH, the amplitude of the heater voltage/power follows a sinusoidal oscillation that causes the fly height to follow the same oscillation. The thermal proximity sensor in the head detects the oscillation and produces an oscillating sensor signal, which when combined with the heater power can be used to determine the contact detect.

In some cases, LFACH has its own limitations in that it may be limited to low heater frequencies, such as those under 1 kHz. At higher frequencies, the fly height does not respond to fluctuations in the power dissipated at the heater. One limitation to heater-induced fly modulation is the thermal time constant for heating the portion of the slider that forms a thermal protrusion. This involves the slider reaching a steady "hot" temperature, with a protrusion and reduced clearance, then cooling to a steady state "cold" temperature with reduced protrusion and increased clearance. If the heater voltage is oscillated too quickly, the slider temperature, as well as the resultant protrusion and clearance, do not have time to respond to the oscillating heater signal and contact detect by LFACH fails. It should be noted that thermal time constraints for heater-induced expansion/retraction may be ~400-500 µs, in which case heater induced fly modulation can be limited to ~1 kHz.

Figure 5:
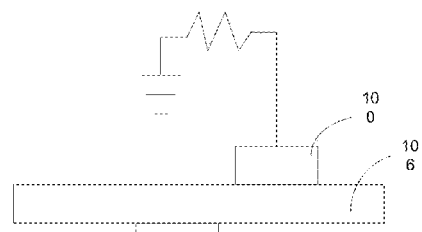
FIG. 5 is a simplified block diagram illustrating a voltage bias applied to a spindle motor in accordance with various embodiments.
Figure 5:
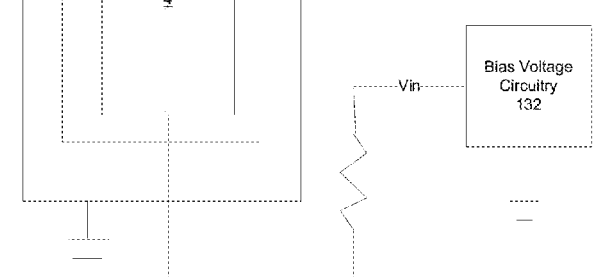

The embodiments described below address the above-noted issues with LFACH by presenting a contact detect/head-medium spacing scheme that utilizes an oscillating electromagnetic attraction. The diagram in FIG. 4 includes additional elements to enable contact detect with the use of the oscillating electromagnetic attraction. For example, FIG. 4 includes a contact detect signal from the controller microprocessor 118 to the preamplifier 114 wherein resides the ability to generate a DC and/or oscillating voltage signal, see generator 130. FIG. 4 additionally includes bias voltage circuitry 132 within the write head 116 to set a reference bias voltage potential of the head 116 relative to the voltage potential of the disk, i.e., magnetic recording medium, which is typically ground. FIG. 5 illustrates the configuration where bias voltage circuitry 132 applies the bias voltage to spindle motor 134 and spinning disk 106. The spindle motor 134 may be electrically isolated from basedeck 135 which is at ground potential. Applying an oscillating bias voltage to the spinning disk 106 allows oscillation of the electromagnetic attraction between the slider 100 and disk 106.

Figure 6:
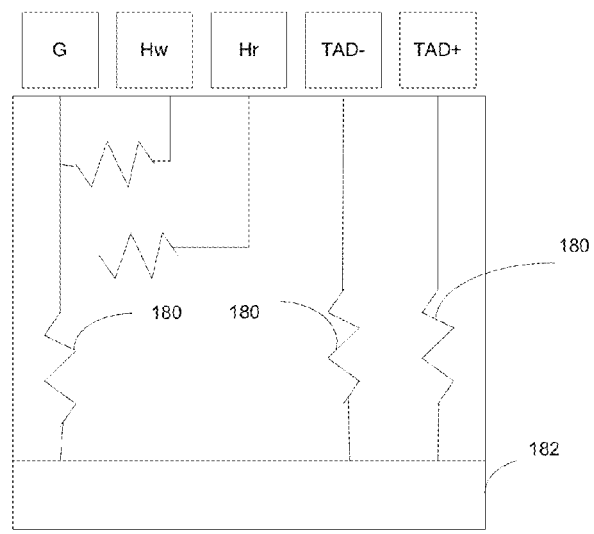
FIG. 6 is a circuit schematic showing a substrate biasing scheme in accordance with various embodiments.

The bias voltage circuitry may be implemented in any known fashion. One example is to use a substrate biasing scheme like that of FIG. 6 where high resistance bleed resistors 180 are balanced between TAD (thermal asperity detector) and G (ground) circuits; Hw and Hr are heaters where Hw is a heater dedicated to heating of the area of the slider near the writer and Hr is a heater dedicated to heating the area of the slider near the reader. The substrate 182 may include AlTiC (aluminum-titanium-carbon) although other substrates may be used as appropriate. A common mode voltage is applied to both TAD+ and TAD−, elevating the substrate potential above the ground potential at G.

Figure 7:
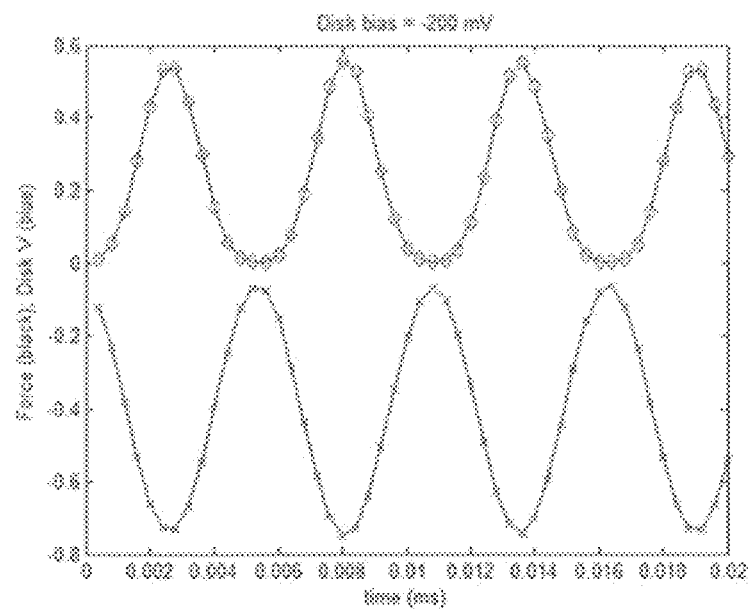
FIG. 7 is a plot that illustrates an example of the variation in voltage and electrostatic force during head-medium contact detection using electromagnetic force in accordance with various embodiments.

In operation, contact detect is initiated by the host 140, prompting the controller microprocessor 148 to signal the oscillating voltage generator 160 within the preamplifier 144 to begin operation. The oscillating voltage is applied to the write head 146 creating an oscillating voltage potential at the head and thus, an oscillating electromagnetic attraction, or force, between the head and disk. The electric potential between the head and disk is oscillated at a single frequency, $\omega$. Because the electrostatic force between the head and disk is related to the voltage squared (F~V2), the electrostatic force has components at the $1^{st}$ and $2^{nd}$ harmonic (or $\omega$ and $2\omega$) of the input voltage signal. An example plot of the voltage signal and resulting electrostatic force is shown in FIG. 7 with the lower plotted line illustrating the measured oscillating disk potential voltage and the upper plotted line illustrating the corresponding calculated electrostatic force between the head and disk. Note that the electrostatic force is a sum of sine waves with frequency $\omega$ and $2\omega$. The clearance between the head and disk oscillates in response to the oscillating electrostatic force. Any changes in clearance result in corresponding changes in thermal conduction across the head disk interface. These changes in thermal conduction are measured by a TCR-type thermal proximity sensor, e.g., thermocouple, single-ended TCR, dual-ended TCR sensor, etc., e.g., sensor 105 in FIGS. 1-3, detects the oscillation and produces a corresponding oscillating sensor signal. The amplitude of the thermal sensor signal at the $1^{st}$ harmonic of the electrostatic force is measured using a software frequency lock-in measurement technique, or dedicated frequency lock-in circuitry. Alternatively, the amplitude of the thermal sensor signal at the $2^{nd}$ harmonic of the electrostatic force could be used.

Figure 8:
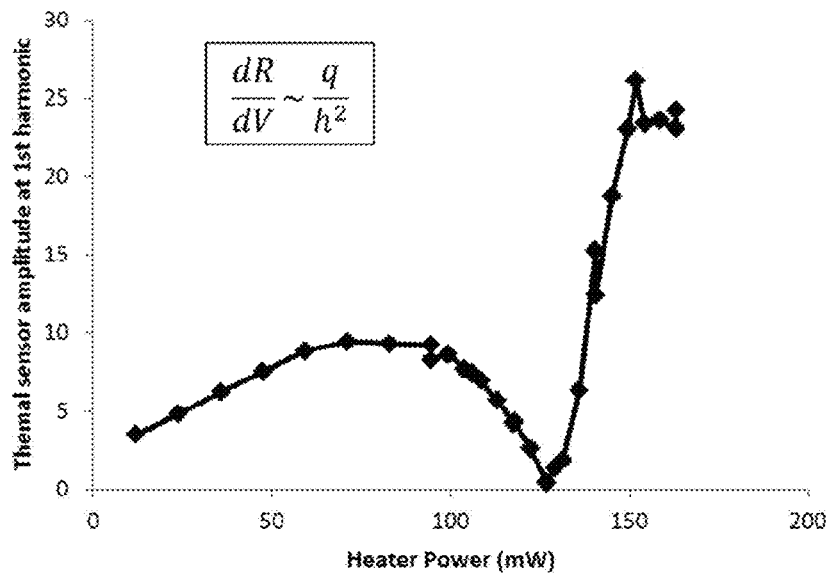
FIG. 8 is a plot that illustrates an example of a thermal sensor amplitude at the first harmonic of the electrostatic force across a head disk interface in response to increased heater powers.

A measurement of the thermal sensor amplitude at frequency ω ($1^{st}$ harmonic) is made for successively increasing applied heater powers. An example plot of thermal sensor response at the $1^{st}$ harmonic of the electrostatic force across the head disk interface is shown in FIG. 8. The resistance of a TCR-type circuit, R, is described by $$R = R_0 + \alpha \frac{q}{h},$$

where $R_0$ is a reference resistance, α is the temperature coefficient of resistance, q is the heat dissipated in the head, and h is the heat transfer coefficient between the head and disk. Measuring the lock-in amplitude of the thermal sensor signal in response to an oscillating voltage applied across the head disk interface is a way to accurately measure the derivative of the TCR-type circuit resistance with respect to the applied voltage, dR/dV. The frequency lock-in signal is expected to obey $$\frac{dR}{dV} = -\alpha \frac{q}{h^2} \frac{dh}{dV}.$$

Thus, the measured lock-in signal is proportional to $q/h^2$. This relation describes the curve in FIG. 8 (where x-axis is heater power in mW and the y-axis is dR/dV (or thermal sensor amplitude a $1^{st}$ harmonic)) and leads to two types of measurements: (i) a prediction of fly height as a function of heater power before contact; and (ii) a heater power at which contact occurs. FIG. 8 shows a linear increase in dR/dV for low heater powers. In this regime, the linear increase in q with heater power causes the increase in dR/dV signal. As the head and thermal sensor continue to approach the disk due to the increased thermal expansion from increased heater power, the dR/dV signal decreases due to a rapid increase in the heat transfer coefficient, h. Once the head contacts the disk, heat is generated from the friction between the head and disk. FIG. 8 shows the onset of head disk contact at 130 mW of heater power.

Figure 9:
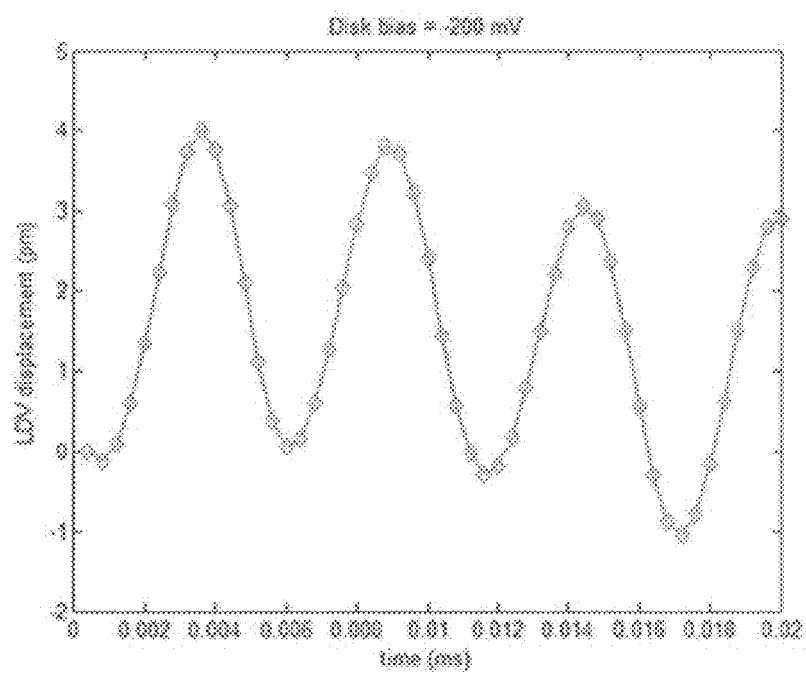
FIG. 9 is a plot that illustrates an example of fly height change in response to an oscillating magnetic force in accordance with various embodiments.

FIG. 7, described earlier and reiterated herein, along with FIG. 9 illustrate the results of an experiment to test the concepts and embodiments described above. In the experimental set-up, a function generator was used to apply an oscillating voltage potential to a spindle and spinning disk, previously biased to −200 mV, while the head remained grounded. Alternatively, the voltage could have been applied to the head with the disk and spindle grounded to produce similar results. Per FIG. 7, the lower plotted line illustrates the measured oscillating disk potential voltage while the upper plotted line illustrates the corresponding calculated electrostatic force between the head and disk. FIG. 9 illustrates the measured laser doppler vibrometer (LDV) displacement signal during application of the oscillating voltage potential to the disk. The LDV displacement signal shows a fly height change in response to the oscillating electromagnetic force.

Figure 10:
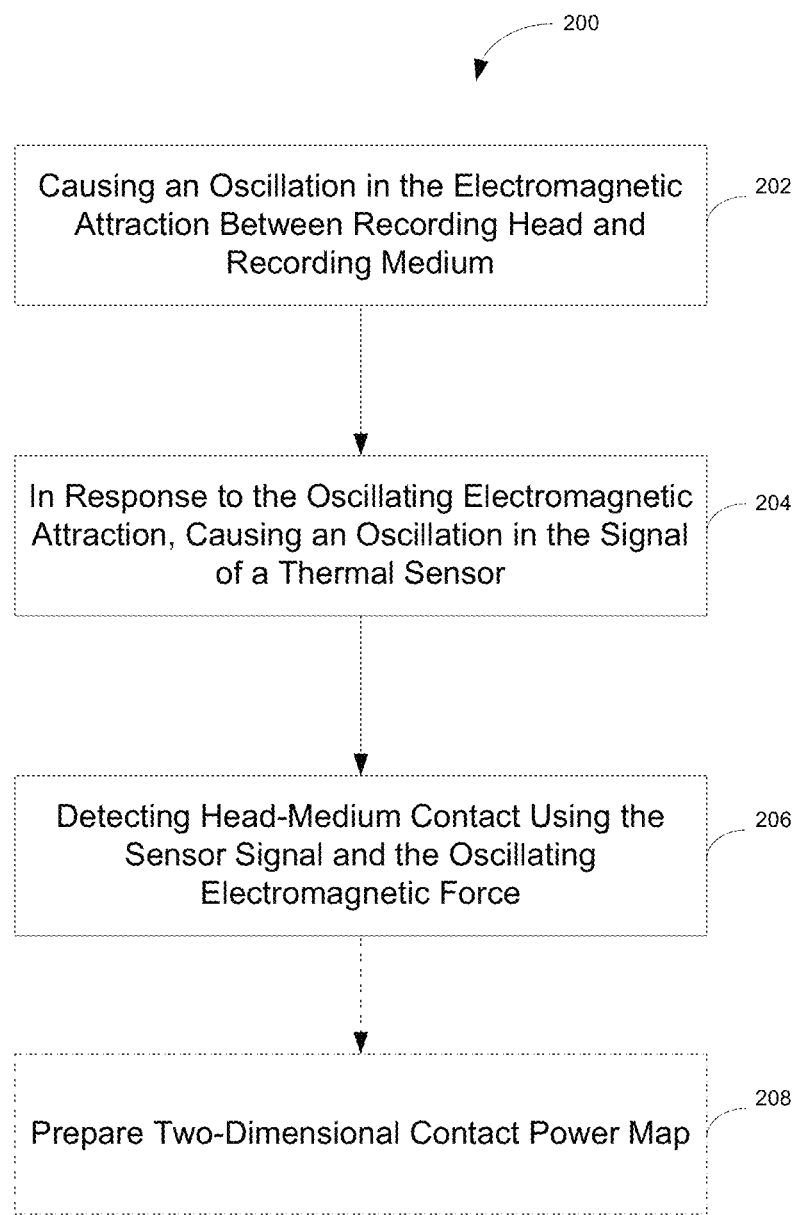
FIG. 10 is a flow chart illustrating the process for head medium contact detection using electromagnetic force in accordance with various embodiments.

With reference to FIG. 10, a method 200 for detecting head-medium contact is shown in accordance with various embodiments. An oscillation in electromagnetic attraction is caused between the recording head and the recording medium (disk) 202. In response to the oscillating electromagnetic attraction, the thermal proximity sensor (DETCR) at the head measures 204 a resulting change in temperature and produces a corresponding oscillating sensor signal. Head-medium contact is detected 206 using the sensor signal response to the oscillating electromagnetic attraction. Preparation of a two-dimension contact power map 208, described in further detail below, may optionally be performed.

The embodiments of the present disclosure make it possible to oscillate the electromagnetic attraction between the head and the disk which causes a matching oscillation in fly height. Notably, it is now possible to modulate the head at much higher resonance frequencies, e.g., 50 kHz to 400 kHz, than that permitted by LFACH, e.g., less than 1 kHz. Using electromagnetic attraction to induce fly height changes during contact detect can reduce contact detect time up to 200 fold compared with LFACH contact detect time. This is due in part to the response time of fly height modulation utilizing electromagnetic attraction being at least 50 times less (e.g., on the order of 50 to 400 times less) than the response time of heater-induced thermal expansion that causes fly height modulation in an LFACH disk drive system.

Reducing the time for contact detection, a necessary in-factory step before a drive is sellable, improves the number of drives that can be manufactured per hour and reduces head wear resulting in improved wear performance and head reliability in the drive over time.

The embodiments of the present disclosure additionally enable contact detect to be performed on different areas of the disk. With the previous LFACH technology, contact detect data collection required more time than was provided by the rotation time of the disk. In fact, data is collected for multiple revolutions of the disk and averaged together. Different contact detect heater powers were possible as a function of disk radius but it made it difficult to create a two-dimensional map of heater powers over the disk surface. The present embodiments provide for increased speed of contact detect that is significantly faster than the disk rotation speed providing the present embodiments with the ability to create a two-dimensional contact power map as a function of both radius and rotation of the recording medium. Moreover, if heater response time of the present embodiments is 1 ms (1 kHz), and rotation time is 8.3 ms (7200 rpm), then it is possible to use eight different heater powers during a single revolution of the disk to produce the desired contact power map. This improved clearance setting resolution enables a more appropriate trade-off between areal density (low clearance) and reliability (high clearance).

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and additions can be made to the disclosed embodiments discussed above. Accordingly, the scope of the present disclosure should not be limited by the particular embodiments described above, but should be defined only by the claims set forth below and equivalents thereof

The invention claimed is:

1. An apparatus comprising:
 a recording head having an electromagnetic attraction to a recording medium,
 circuitry configured to oscillate the electromagnetic attraction between the recording head and the recording medium, wherein the oscillating electromagnetic attraction produces a corresponding oscillating clearance between the recording head and the recording medium;
 a dedicated thermal sensor in or near the recording head to sense an oscillating temperature induced by the oscillating clearance and produce a sensor signal representative of a sensed temperature; and
 a detector coupled to the dedicated thermal sensor and configured to detect at least one of head-medium contact and clearance using the sensor signal and the electromagnetic attraction.

2. The apparatus of claim 1, wherein the electromagnetic attraction is controlled by setting an electric potential at the recording head and/or the recording medium.

3. The apparatus of claim 1, wherein the oscillating electromagnetic attraction has a frequency substantially within a range of 50 kHz to 400 kHz.

4. The apparatus of claim 1, wherein the detector is additionally configured to detect head-medium contact power as a function of both radius and rotation of the recording medium.

5. The apparatus of claim 1, further comprising a controller coupled to the detector, the controller configured to produce a two-dimensional contact power map based on a detected head-medium contact power as a function of both a radius and a rotation of the recording medium.

6. The apparatus of claim 1, wherein the dedicated thermal sensor comprises a thermocouple, a single ended temperature coefficient of resistance sensor, or a dual-ended temperature coefficient of resistance (DETCR) sensor.

7. The apparatus of claim 1, wherein the recording head comprises a heater that changes the head-medium clearance via thermal expansion, wherein a response time of the oscillating electromagnetic attraction is at least 50 times less than a response time of the thermal expansion.

8. An apparatus comprising:
 circuitry configured to oscillate an electromagnetic attraction between a recording head and a recording medium, wherein the oscillating electromagnetic attraction produces a corresponding oscillating clearance between the recording head and the recording medium; and
 a controller coupled to the circuitry and configured to:
  sense an oscillating temperature induced by the oscillating clearance with a dedicated thermal sensor; and
  detect head-medium contact using a sensed temperature and the electromagnetic attraction.

9. The apparatus of claim 8, wherein the circuitry is additionally configured to set an electric potential at the recording head and/or recording medium and wherein the electric potential affects the electromagnetic attraction.

10. The apparatus of claim 8, wherein oscillating electromagnetic attraction has a frequency substantially in a range of 50 kHz to 400 kHz.

11. The apparatus of claim 8, wherein the controller is additionally configured to detect head-medium contact power as a function of both radius and rotation of the recording medium.

12. The apparatus of claim 8, wherein the controller is additionally configured to produce a two-dimensional contact power map based on a detected head-medium contact power as a function of both a radius and a rotation of the recording medium.

13. The apparatus of claim 8, wherein the dedicated thermal sensor comprises a dual-ended coefficient of resistance (DETCR) sensor, a single ended temperature coefficient of resistance sensor, or a thermocouple temperature sensor.

14. The apparatus of claim 8, wherein the recording head comprises a heater that changes the head-medium clearance via thermal expansion, wherein a response time of the oscillating electromagnetic attraction is at least 50 times less than a response time of the thermal expansion.

15. A method comprising:
 causing an oscillation in electromagnetic attraction between a recording head and a recording medium;
 causing, by the oscillating electromagnetic attraction, an oscillation in a signal produced by a dedicated thermal sensor in or near the recording head; and
 detecting head-medium contact using the signal from the dedicated thermal sensor and the electromagnetic attraction.

16. The method of claim 15, further comprising oscillating an electrical potential at the recording head and/or recording medium.

17. The method of claim 15, wherein the oscillating electromagnetic attraction has a frequency substantially in a range of 50 kHz to 400 kHz.

18. The method of claim 15, further comprising detecting head-medium contact power as a function of both radius and rotation of the recording medium.

19. The method of claim 15, wherein the dedicated thermal sensor comprises a dual-ended temperature coefficient of resistance (DETCR) sensor, a single ended temperature coefficient of resistance sensor, or a thermocouple temperature sensor.

20. The method of claim 15, further comprising heating the recording head to produce a change in head-medium clearance via thermal expansion, wherein a response time of the electromagnetic attraction is at least 50 times less than a response time of the thermal expansion.

* * * * *